United States Patent
Dekens

(10) Patent No.: US 11,321,265 B2
(45) Date of Patent: May 3, 2022

(54) ASYNCHRONOUS COMMUNICATION

(71) Applicant: Nordic Semiconductor ASA, Trondheim (NO)

(72) Inventor: Berend Dekens, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/255,865

(22) PCT Filed: Jun. 26, 2019

(86) PCT No.: PCT/EP2019/067013
§ 371 (c)(1),
(2) Date: Dec. 23, 2020

(87) PCT Pub. No.: WO2020/002433
PCT Pub. Date: Jan. 2, 2020

(65) Prior Publication Data
US 2021/0263876 A1 Aug. 26, 2021

(30) Foreign Application Priority Data
Jun. 29, 2018 (GB) .................................... 1810785

(51) Int. Cl.
*G06F 13/40* (2006.01)
*G06F 13/42* (2006.01)

(52) U.S. Cl.
CPC ...... *G06F 13/4054* (2013.01); *G06F 13/4031* (2013.01); *G06F 13/4286* (2013.01)

(58) Field of Classification Search
CPC ............. G06F 13/4054; G06F 13/4031; G06F 13/4286
(Continued)

(56) References Cited

U.S. PATENT DOCUMENTS

| 5,088,028 A | 2/1992 | Theus et al. |
| 5,692,137 A | 11/1997 | Regal et al. |

(Continued)

FOREIGN PATENT DOCUMENTS

| CN | 1983223 A | 6/2007 |
| CN | 106909524 A | 6/2017 |

(Continued)

OTHER PUBLICATIONS

IPO Search Report under Section 17(5) for GB1810785.4, dated May 16, 2019, 3 pages.
(Continued)

*Primary Examiner* — Brian T Misiura
(74) *Attorney, Agent, or Firm* — Klarquist Sparkman, LLP

(57) ABSTRACT

A method of transferring data from a first bus to a second bus across an asynchronous interface using an asynchronous bridge. The bridge comprises a bus slave module, connected to the first bus, comprising a forward-channel initiator in a first power and/or clock domain; and a bus master module, connected to the second bus, comprising a forward-channel terminator in a second power and/or clock domain. The forward-channel initiator and terminator are in communication to form a forward lockable mutex for arbitrating access to signals used to transfer data from the first domain to the second domain. If the mutex is locked, a forward data channel is used to transfer data between the domains. Otherwise if the mutex is unlocked, the forward channel initiator toggles a status request signal and the forward channel terminator toggles a status acknowledge signal in response, the mutex thereby becoming locked.

11 Claims, 7 Drawing Sheets

(58) Field of Classification Search
USPC .......................................................... 710/306
See application file for complete search history.

(56) References Cited

U.S. PATENT DOCUMENTS

| | | | |
|---|---|---|---|
| 6,247,082 B1 | 6/2001 | Lo et al. | |
| 7,117,496 B1* | 10/2006 | Ramesh | G06F 9/52 |
| | | | 718/102 |
| 7,694,312 B2* | 4/2010 | Rivard | G06F 9/542 |
| | | | 719/321 |
| 8,667,195 B2* | 3/2014 | Jeong | G06F 13/14 |
| | | | 710/110 |
| 8,996,152 B2* | 3/2015 | Terrell | G06F 9/526 |
| | | | 700/100 |
| 9,537,679 B2* | 1/2017 | Nowick | H04L 25/03 |
| 2005/0108482 A1 | 5/2005 | Fuks | |
| 2008/0059669 A1 | 3/2008 | Lin | |
| 2012/0226865 A1* | 9/2012 | Choi | G06F 13/1642 |
| | | | 711/121 |
| 2013/0138848 A1 | 5/2013 | Jeong et al. | |
| 2014/0115210 A1 | 4/2014 | Chirca et al. | |
| 2015/0149809 A1 | 5/2015 | Feero et al. | |
| 2016/0378152 A1 | 12/2016 | Akimoto | |

FOREIGN PATENT DOCUMENTS

| | | |
|---|---|---|
| CN | 108345564 A | 7/2018 |
| WO | WO 2006/120470 A2 | 11/2006 |
| WO | WO 2009/069094 A1 | 6/2009 |

OTHER PUBLICATIONS

International Search Report and Written Opinion for PCT/EP2019/067013, dated Sep. 24, 2019, 12 pages.
Novelty Search conducted by the Norwegian Industrial Patent Office, dated Apr. 8, 2019, 9 pages.

* cited by examiner

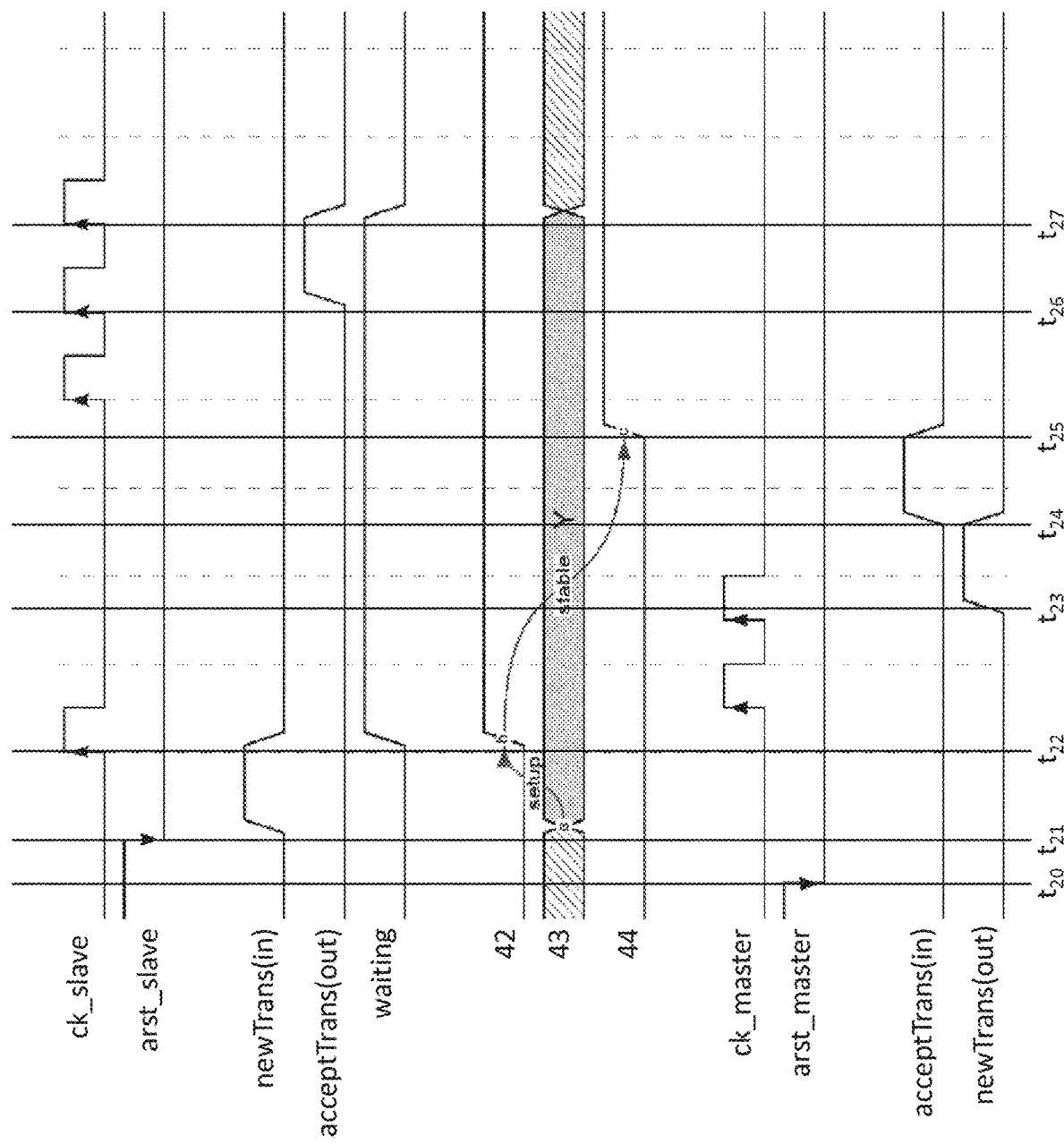

ASYNCHRONOUS COMMUNICATION

CROSS REFERENCE TO RELATED APPLICATIONS

This is the U.S. National Stage of International Application No. PCT/EP2019/067013, filed Jun. 26, 2019, which was published in English under PCT Article 21(2), which in turn claims the benefit of Great Britain Application No. 1810785.4, filed Jun. 29, 2018.

TECHNICAL FIELD

The present invention relates to asynchronous communication, in particular to the asynchronous transfer of data across clock and/or power domain crossings in an electronic device.

BACKGROUND

Modern electronic devices, for example radio transceiver devices arranged to carry out wireless communication such as Bluetooth® or Wi-Fi® communication, may have two or more different power and/or clock domains that may be required, at least sporadically, to communicate with each other.

A clock domain refers to circuitry that is driven by a particular clock signal while a power domain refers to circuitry that driven by the same supply voltage. For example, a central processor may run in a first clock domain at a relatively high frequency while one or more peripherals may run in a second clock domain at a relatively low frequency. Generally speaking, when different power and clock domains are not synchronised with each other, an asynchronous crossing of signals across power and/or clock domain boundaries is required to pass from one domain to another.

This is relevant for transferring data between two different buses, e.g. between two AHB buses where each bus is in a different clock and/or power domain, where AHB is an Advanced High Performance Bus (AHB) within the Arm® AM BA® (Advanced Microcontroller Bus Architecture) protocol, an open standard interconnect specification for the connection and management of functional blocks in a system-on-chip (SoC), i.e. for on-chip communication. An asynchronous AHB-AHB bridge may typically be used to facilitate the transfer of data from one AHB to the other, where the originating AHB is connected as a slave component to the bridge, (referred to herein as a 'slave') and the destination AHB has the same bridge connected as an AHB master component (referred to herein as a 'master').

It is known in systems which include different power and/or clock domains which are not synchronised to each other, and may be of different frequencies, to employ a "handshaking" procedure in which the clock domains negotiate parameters in order to establish that each side is in agreement as to the state of a specific data signal or signals crossing the boundary between the domains. This is necessary so that a signal can be transferred from one power and/or clock domain to another during a safe period for doing so (e.g. away from a transition in the clock signal used by the receiving clock domain).

One type of handshaking procedure, known in the art per se, is a two-phase or two-step handshaking procedure. In a two-phase handshaking procedure, the initiator begins by toggling the state of its request signal (i.e. flipping the signal either from low to high or from high to low, changing its previous state to the opposite state as appropriate). The receiver then acknowledges this request by toggling the state of its acknowledgement signal ro complete the handshake. However, the Applicant has appreciated that this two-phase process is unsuitable for use when either side—i.e. the initiator or receiver—may reset (or even power off, such that isolation clamp values define the signal state observed by the other side) during the handshake as this reset can, in some circumstances, be seen as the completion of the handshake. For example, if the acknowledgement signal was previously high and the receiver resets, the acknowledgement signal may change to low due to the reset rather than as an actual acknowledgement of the initiator's request. The result of this would be that any data being transferred across a power and/or clock boundary would be lost as the receiving side is not actually capable of receiving any data. This issue of undesired state changes due to reset and/or losing power in a handshake is known as desynchronisation.

There exists also a four-phase handshaking procedure, known in the art per se, that attempt to overcome this drawback, for example making use of Gray coding to allow invalid transitions to be detected. However, known four-phase handshaking procedures are relatively slow as they begin and end each handshake in a defined 'idle' or 'start' phase, which requires four phase transitions to return to 'idle' or 'start'. As such, while a four phase handshake is more resilient against data loss due to desynchronisation, a four phase handshake takes twice as long as a two phase handshake, resulting in a severe throughput penalty It is an aim of the present invention to provide improved systems and methods for communication between two different power and/or clock domains.

SUMMARY OF THE INVENTION

When viewed from a first aspect, the present invention provides an asynchronous bridge arranged to transfer data from a first bus to a second bus across an asynchronous interface between said first and second buses, said asynchronous bridge comprising:
 a slave module, connected to the first bus, comprising a status mutex initiator, and a semaphore initiator; and
 a master module, connected to the second bus, comprising a status mutex terminator, and a semaphore terminator;
 wherein the status mutex initiator and the status mutex terminator are in communication together to form a lockable status mutex;
 wherein the slave module is arranged to determine whether the status mutex is locked and wherein the status mutex is arranged to unlock when either of the slave module and the master module is reset;
 said asynchronous bridge being arranged such that:
 if the status mutex is not locked when the slave module has data to send to the master module, the asynchronous bridge attempts to lock the status mutex;
 if the status mutex is locked when the slave module has data to send to the master module, the semaphore initiator toggles a data request flag and sends the data to the master module across the asynchronous interface; and
 the semaphore terminator toggles a data acknowledge flag after the master module receives the data from the slave module.

This first aspect of the invention extends to a method of operating an asynchronous bridge arranged to transfer data from a first bus to a second bus across an asynchronous interface between said first and second buses, said asynchronous bridge comprising:

a slave module, connected to the first bus, comprising a status mutex initiator, and a semaphore initiator; and a master module, connected to the second bus, comprising a status mutex terminator, and a semaphore terminator;

wherein the status mutex initiator and the status mutex terminator are in communication together to form a lockable status mutex;

wherein the slave module is arranged to determine whether the status mutex is locked and wherein the status mutex is arranged to unlock when either of the slave module and the master module is reset;

the method comprising:

if the status mutex is not locked when the slave module has data to send to the master module, attempting to lock the status mutex;

if the status mutex is locked when the slave module has data to send to the master module, operating the semaphore initiator to toggle a data request flag and to send the data to the master module across the asynchronous interface; and operating the semaphore terminator to toggle a data acknowledge flag after the master module receives the data from the slave module.

When viewed from a second aspect, the present invention provides a handshake algorithm used to implement an asynchronous bridge arranged to transfer data from a first bus to a second bus across an asynchronous interface between said first and second buses, said asynchronous bridge comprising:

a bus slave module, connected to the first bus, comprising a forward-channel initiator and a reverse-channel terminator; and a bus master module, connected to the second bus, comprising a forward-channel terminator and a reverse-channel initiator;

wherein the forward-channel initiator and the forward-channel terminator are in communication together to form a lockable mutex used in arbitrating access to signals used to transfer data between logic from the forward-channel initiator power and/or clock domain to the forward-channel terminator power and/or clock domain;

wherein the reverse-channel initiator and the reverse-channel terminator are in communication together to form a lockable mutex used in arbitrating access to signals used to transfer data between logic from the reverse-channel initiator power and/or clock domain to the reverse-channel terminator power and/or clock domain;

wherein each initiator and terminator pair are connected, forming a mutex or semaphore with value one for a data channel, said asynchronous bridge being arranged such that:

if either side of the bridge is reset or loses power thereby giving rise to a desynchronisation of the mutexes, said desynchronisation is detected by the initiator or terminator on the other side;

if both sides of the bridge are reset (or lose power) thereby giving rise to a desynchronisation, automatic resynchronisation takes place;

if both sides are synchronised, the forward and reverse data channels can be used to transfer data between power and/or clock domains as required by the bus protocol being implemented by this bridge;

if both sides of the bridge are reset, upon the first use of a channel a two phase handshake is used to signal an intent to use the bridge, where both initiator and terminator start with a request for status and acknowledgement for status from a defined state comprising either both signals being reset high or both signals being reset low, the status between both sides thereby being locked after the initiator toggles its status request signal and the terminator toggles its status acknowledge signal in response;

if both sides of an asynchronous data channel have status lock, the status-request and status-acknowledge signals are no longer allowed to change such once asserted, these signals are arranged to retain their value until either side desynchronizes;

if both sides of an asynchronous data channel have status lock, a toggle of status-request or status-acknowledge to the reset value is seen by the other side as a desynchronisation;

if a status lock is obtained, two additional signals are used to implement a handshake whereby each toggle of a data-request signal indicates a request for handshake and each toggle of data-acknowledge indicates the completion of the handshake;

if during a data transfer the status signals change value, and thus a desynchronisation is detected, the detecting side is arranged to change all signals to the reset values, the desynchronized side being arranged, when its reset completes before the other side can return to the reset value, to wait until all handshake signals across the boundary are their reset values again.

When viewed from a third aspect, the present invention provides a method of transferring data from a first bus to a second bus across an asynchronous interface between said first and second buses, using an asynchronous bridge comprising:

a bus slave module, connected to the first bus, comprising a forward-channel initiator and a reverse-channel terminator in a first power and/or clock domain; and a bus master module, connected to the second bus, comprising a forward-channel terminator and a reverse-channel initiator in a second power and/or clock domain;

wherein the forward-channel initiator and the forward-channel terminator are in communication to form a forward lockable mutex for arbitrating access to signals used to transfer data from the first power and/or clock domain to the second power and/or clock domain; and wherein the reverse-channel initiator and the reverse-channel terminator are in communication to form a reverse lockable mutex for arbitrating access to signals used to transfer data from the second power and/or clock domain to the first power and/or clock domain;

the method comprising:

if either side of the asynchronous bridge is reset or loses power thereby giving rise to a desynchronisation of the mutexes, detecting said desynchronisation by the initiator or terminator on the other side;

if both sides of the asynchronous bridge are reset or lose power thereby giving rise to a desynchronisation, automatically performing a resynchronisation;

if both sides of the asynchronous bridge are synchronised, using the forward and reverse data channels to transfer data between said first and second power and/or clock domains;

if both sides of the asynchronous bridge are reset, upon a first use of a channel using a two phase handshake to signal an intent to use the asynchronous bridge, comprising one of said initiators and the corresponding terminator starting a request for status and acknowledgement for status respectively from a defined state comprising either both signals being reset high or both signals being reset low, the status between both sides thereby being locked after the initiator toggles its status request signal and the terminator toggles its status acknowledge signal in response;

if both sides of an asynchronous data channel have status lock, preventing the status-request and status-acknowledge signals from changing once asserted;

if both sides of an asynchronous data channel have status lock, treating a toggle of a status-request or a status-acknowledge to a reset value as a desynchronisation;

if a status lock is obtained, using two additional signals to implement a handshake whereby each toggle of a data-request signal indicates a request for handshake and each toggle of data-acknowledge indicates the completion of the handshake;

if during a data transfer the status signals change value, and thus a desynchronisation is detected, the detecting side changing all signals to corresponding reset values, the desynchronized side, when its reset completes before the other side can return to the reset value, waiting until all handshake signals across the boundary are their reset values again.

When viewed from a fourth aspect, the present invention provides a method of transferring data from a first bus to a second bus across an asynchronous interface between said first and second buses, using an asynchronous bridge comprising:

a bus slave module, connected to the first bus, comprising a forward-channel initiator in a first power and/or clock domain; and a bus master module, connected to the second bus, comprising a forward-channel terminator in a second power and/or clock domain;

wherein the forward-channel initiator and the forward-channel terminator are in communication to form a forward lockable mutex for arbitrating access to signals used to transfer data from the first power and/or clock domain to the second power and/or clock domain;

the method comprising:

if said lockable mutex is locked, using a forward data channel to transfer data between said first and second power and/or clock domains;

if said lockable mutex is unlocked, said forward channel initiator toggling a status request signal and the forward channel terminator toggling a status acknowledge signal in response; the lockable mutex thereby becoming locked.

This fourth aspect of the invention extends to an asynchronous bridge arranged to transfer data from a first bus to a second bus across an asynchronous interface between said first and second buses, said asynchronous bridge comprising:

a bus slave module, connected to the first bus, comprising a forward-channel initiator in a first power and/or clock domain; and a bus master module, connected to the second bus, comprising a forward-channel terminator in a second power and/or clock domain;

wherein the forward-channel initiator and the forward-channel terminator are in communication to form a forward lockable mutex for arbitrating access to signals used to transfer data from the first power and/or clock domain to the second power and/or clock domain;

wherein the asynchronous bridge is arranged such that:

if said lockable mutex is locked, the asynchronous bridge uses a forward data channel to transfer data between said first and second power and/or clock domains;

if said lockable mutex is unlocked, said forward channel initiator toggles a status request signal and the forward channel terminator toggles a status acknowledge signal in response; the lockable mutex thereby becoming locked.

In a set of embodiments the bus slave module comprises a reverse-channel terminator and the bus master module comprises a reverse-channel initiator wherein the reverse-channel initiator and the reverse-channel terminator are in communication to form a reverse lockable mutex for arbitrating access to signals used to transfer data from the second power and/or clock domain to the first power and/or clock domain.

In a set of the foregoing embodiments, the method further comprises:

if said reverse lockable mutex is locked, using a reverse data channel to transfer data between said second and first power and/or clock domains;

if said reverse lockable mutex is unlocked, said reverse channel initiator toggling a status request signal and the reverse channel terminator toggling a status acknowledge signal in response; the reverse lockable mutex thereby becoming locked.

In a set of embodiments if either side of the asynchronous bridge is reset or loses power thereby giving rise to a desynchronisation of the lockable mutex and/or the reverse lockable mutex, detecting said desynchronisation by the initiator or terminator on the other side;

In a set of embodiments if both sides of the asynchronous bridge are reset or lose power thereby giving rise to a desynchronisation, automatically performing a resynchronisation.

In a set of embodiments if the lockable mutex and/or the reverse lockable is/are locked, and a status request signal or a status acknowledge signal changes value, performing a resynchronisation.

In a set of the foregoing embodiments said resynchronisation comprises one of said channel initiators toggling a status request signal and the corresponding channel terminator toggling a status acknowledge signal in response; the lockable mutex and/or the reverse lockable mutex thereby becoming locked.

In a set of embodiments if the lockable mutex and/or the reverse lockable is/are locked, preventing a change in the status request and status acknowledge signals.

In a set of embodiments if the lockable mutex and/or the reverse lockable is/are locked, using two additional signals to implement a handshake whereby each toggle of a data-request signal indicates a request for handshake and each toggle of data-acknowledge indicates the completion of the handshake.

In a set of embodiments if, during a data transfer the status request and/or status acknowledge signals change value, one of the slave module and the master module which has detected said change in value, changing all signals to corresponding reset values and the other of the slave module and the master module, when its reset completes before the other side can return to the reset value, waiting until all handshake signals across the boundary are their reset values again.

When viewed from a fifth aspect, the present invention provides an asynchronous bridge arranged to transfer data from a first bus to a second bus across an asynchronous interface between said first and second buses, said asynchronous bridge comprising:

a slave module, connected to the first bus, comprising a status mutex initiator; and a master module, connected to the second bus, comprising a status mutex terminator;

wherein the status mutex initiator and the status mutex terminator are in communication together to form a lockable status mutex wherein the slave module is arranged to determine whether the status mutex is locked and wherein the status mutex is arranged to unlock when either of the slave module and the master module is reset;

said asynchronous bridge being arranged such that:

if the status mutex is not locked when the slave module has data to send to the master module, the asynchronous bridge attempts to lock the status mutex;

if the status mutex is locked when the slave module has data to send to the master module, the slave module toggles a data request signal and sends the data to the master module across the asynchronous interface; and the master module toggles a data acknowledge signal after the master module receives the data from the slave module.

When viewed from a sixth aspect, the present invention provides an asynchronous bridge for transferring data from a first bus to a second bus across an asynchronous interface between said first and second buses, said asynchronous bridge comprising:

a first module, connected to the first bus, comprising an initiator in a first power and/or clock domain; and a second module, connected to the second bus, comprising a terminator in a second power and/or clock domain;

wherein the initiator and the terminator are in communication to form a lockable mutex for arbitrating access to signals used to transfer data from the first power and/or clock domain to the second power and/or clock domain;

the asynchronous bridge being arranged so that:

if said lockable mutex is locked, the asynchronous bridge transfers data between said first and second power and/or clock domains;

if said lockable mutex is unlocked, one of the first and second modules toggles a status request signal and the other of the first and second modules toggles a status acknowledge signal in response; the lockable mutex thereby becoming locked.

In a set of embodiments of one or both of the first and second modules is reset or powered down, the mutex becomes unlocked.

When viewed from a seventh aspect, the present invention provides an asynchronous bridge for transferring data from a first bus to a second bus across an asynchronous interface between said first and second buses, said asynchronous bridge comprising:

a first module, connected to the first bus, in a first power and/or clock domain;

a second module, connected to the second bus, in a second power and/or clock domain; and a status indicator arranged to indicate whether said first and second modules are synchronised, wherein said asynchronous bridge is arranged to transfer data between the first and second buses using a two phase handshake procedure if said status indicator indicates that said first and second modules are synchronised and wherein said asynchronous bridge is arranged to transfer data between the first and second buses using a four phase handshake procedure if said status indicator indicates that said first and second modules are not synchronised.

In accordance with embodiments of the invention, there is provided an improved electronic device and method of operating the same in which an improved four-phase handshake is used to determine whether the slave and master modules have been desynchronised before completing the transfer of data across the asynchronous interface. The Applicant has appreciated that such an arrangement may result in a handshake protocol with the same number of phases as a conventional four-phase handshake when no status synchronisation is available (e.g. when one or both sides are not powered up and ready for use)—namely two steps dedicated to performing a status handshake and then two steps dedicated to performing a data transfer handshake, but then only requires the two-phase data transfer handshake for subsequent data transfers until either or both of the master and slave modules reset (and the status 'lock' is lost due to desynchronisation).

In at least embodiments, an initial four-phase handshake is carried out for the first transaction, and the described handshake is used in order to monitor that neither the slave module nor the master module has reset and caused a desynchronisation (because if one or both of these modules resets, the semaphore/mutex has to reset i.e. loses its lock), which provides the robustness associated with some known four-phase handshake procedures as outlined above. However, subsequent transactions may advantageously occur at the speeds typically associated with two-phase handshake procedures, because the semaphore/mutex is used to ensure that the synchronisation status established earlier in the initial four phase handshake procedure can still be trusted, removing the need to check the synchronisation status for every data transaction.

As outlined previously, those skilled in the art will appreciate that the term 'desynchronisation' and derivatives thereof as used herein mean that the initiator and terminator modules, which are typically asynchronous from the point of view of their clock domains but communicate across the asynchronous interface through use of handshake arrangements to implement a mutex, become 'out of step' with one another, for example where the internal states of each module conflict with one another. This misalignment of states is thus more than merely a consequence of how the modules are clocked.

As most bus protocols only provide the possibility for data to be sent by a bus slave to a bus master in response to a request by said master, the reverse data channel of the described bridge may only be used when the forward data channel is used to pass a request from a component with a bus master in one power and/or clock domain to a component with bus slave in another. As such, the status part of the handshake as described may provide the same information for both the forward and reverse mutexes. In order to save time and logic, the reverse channel can therefore use the status lock of the forward channel, as any desynchronisation happens for both channels at the same time.

Those skilled in the art will appreciate that the described handshake may be seen as a composite of a status handshake or status mutex and a data handshake or data mutex.

As with existing two and four phase handshakes when applied across asynchronous boundaries, a desynchronisation due to reset or otherwise can cause data hazards when sampling data (across this asynchronous boundary) as well as race conditions due to data hazards (meta-stability or asynchronous reset between signals) on the control signals. Embodiments may seek to mitigate these by any one of more of the following: delaying detected phase changes for the data mutex by one cycle, holding data after capture for enough cycles to detect whether captured data is valid (reducing throughput) or providing an early warning signal to the bridge component that the other side is bound to reset soon and any changes from the data mutex should be ignored to prevent a data hazard (best performance).

Any unexpected reset of the receiving side may, in some arrangements, be detected and recovered from using only information from the 'control channels', where one channel, handled by the status mutex, carries status information (that both the slave module and the master module are ready to carry out transactions) and the second channel, handled by the semaphore or data mutex (e.g. the semaphore initiator and terminator pair), provides a transaction-specific handshake to guard data crossing the asynchronous interface, i.e. a power and/or clock boundary.

The Applicant has appreciated that an asynchronous bridge in accordance with embodiments of the present invention may support multiple independent power domains and resets, unlike conventional two-phase handshake procedures known in the art per se. Furthermore, because the power and reset status may be determined locally by such a bridge, there may advantageously be no need for a global power and clock manager.

It will be appreciated by those skilled in the art that a mutex is typically an arrangement that provides for mutual exclusion concurrency control (i.e. control that ensures correct results for concurrent operations). In some embodiments, the status mutex comprises a control request flag, a control acknowledgement flag, and a mutex lock flag, wherein the status mutex is arranged such that:
  the status mutex initiator raises the control request flag only when the control acknowledgement flag is not raised;
  the status mutex terminator raises the control acknowledgement flag in response to the control request flag being raised only when the mutex lock flag is not raised;
  the status mutex is locked and the status mutex initiator raises the mutex lock flag in response to the control acknowledgement flag being raised.

The status mutex may be considered the implementation part of the described handshake which ensures both sides are ready for use.

The semaphore referred to herein may have a value of 1 and thus may be considered to be a mutex or a data mutex. References herein to a semaphore initiator and a semaphore terminator may therefore be understood accordingly as references to a mutex initiator and a mutex terminator respectively or to a data mutex initiator and a data mutex terminator.

In a set of such embodiments, the master module is arranged to determine that a desynchronisation event has occurred when the control request flag and the mutex lock flag are raised while the status mutex is not locked.

Thus, in accordance with such embodiments, the slave module may be arranged to determine that a desynchronisation event has not yet been detected by the master module, which is indicated by the control acknowledgement flag being raised even though the slave module has not raised the control request flag since the last reset of the slave module.

It will be appreciated that the embodiments of the present invention described hereinabove provide for communication of data from the first bus to the second bus, such that the semaphore/data mutex initiator of the slave module and the semaphore/data mutex terminator of the master module form a transaction channel. In some embodiments the slave module comprises a return (reverse-channel) data mutex/semaphore terminator and the master module comprises a return data mutex/semaphore initiator, wherein the asynchronous bridge is further arranged such that:
  if the status mutex is not locked when the master module has data to send to the slave module, the asynchronous bridge attempts to lock the status mutex;
  if the status mutex is locked when the master module has data to send to the slave module, the semaphore/data mutex initiator toggles a return data request flag and sends the data to the slave module across the asynchronous interface; and
  the return semaphore/data mutex terminator toggles a return data acknowledge flag after the slave module receives the return data from the master module. The Applicant has appreciated that providing the slave module with a return semaphore/data mutex initiator and the master module with a return semaphore/data mutex terminator provides a return channel, across which the master module can send return data to the slave module.

In at least some embodiments, the slave module raises a valid flag when it has data to send to the master module, wherein the valid flag is cleared when the slave module is reset. Preferably, the valid flag is cleared when either of the slave module and the master module is reset. In a set of potentially overlapping embodiments wherein a return channel is provided as outlined above, the master module raises a further valid flag when it has data to send to the slave module, wherein the further valid flag is cleared when the master module is reset. Preferably, the further valid flag is cleared when either of the slave module and the master module is reset.

It will be appreciated by those skilled in the art that an asynchronous bridge operating in accordance with embodiments of the claimed invention may overcome issues with an unscheduled power off (or reset) occurring which causes erroneous behaviour in the master module and/or the slave module. However, the Applicant has appreciated that, in some situations, power offs and resets might be known about in advance, i.e. they are scheduled, albeit not always a long time in advance—i.e. such a reset may be scheduled for a certain time or may be scheduled imminently in response to a particular event. In some embodiments, the slave module is arranged to send a warning signal directly to the master module when the slave module has a power off event or reset event scheduled, wherein the master module is arranged to abort any current transaction of data across the asynchronous interface upon receiving said warning signal. In a set of potentially overlapping embodiments, the master module is arranged to send a warning signal directly to the slave module when the master module has a power off event or reset event scheduled, wherein the slave module is arranged to abort any current transaction of data across the asynchronous interface upon receiving said warning signal. Thus, in accordance with such embodiments, the slave module and/or the master module may be warned in advance of an upcoming power off of the other module and abort any current transactions which may prevent errors.

BRIEF DESCRIPTION OF DRAWINGS

Certain embodiments of the invention will now be described, by way of non-limiting example only, with reference to the accompanying drawings in which.

FIG. 7 is a timing diagram showing the operation of the semaphore used in the asynchronous bridge of FIG. 1.

FIG. 1 is a schematic diagram of an asynchronous bridge 2 in accordance with an embodiment of the present invention. The asynchronous bridge 2 comprises a slave module 4 and a master module 6, which are separated by an asynchronous boundary 7. This asynchronous boundary 7 is a result of the slave module 4 and master module 6 being located within different power and clock domains. It will of course be appreciated that the slave module 4 and master module 6 could be in different clock domains but in the same power domain or vice versa, however in this exemplary embodiment, the modules 4, 6 are in both different clock and power domains.

Figure 1:
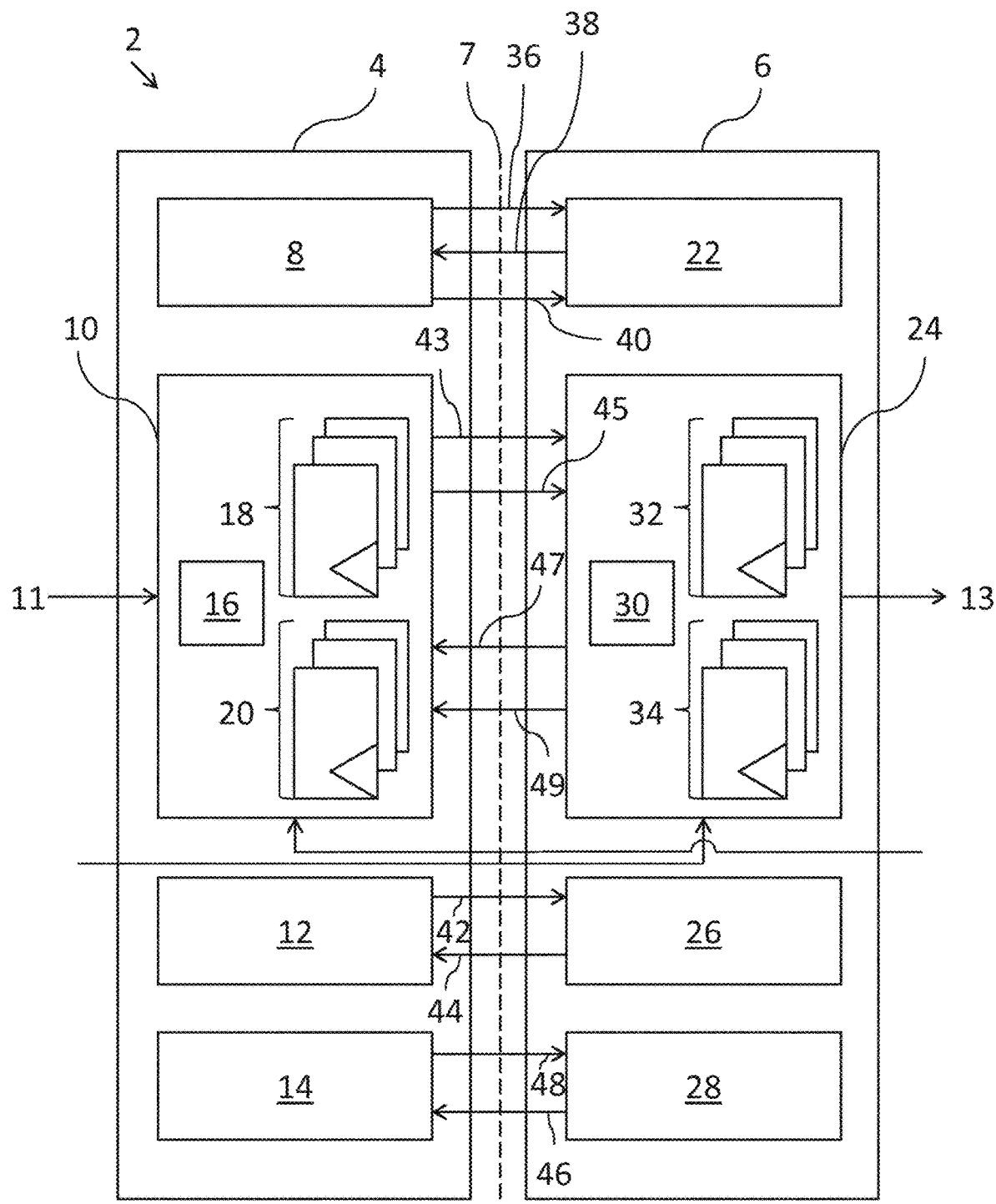
FIG. 1 is a schematic diagram of an asynchronous bridge in accordance with an embodiment of the present invention.

The slave module 4 comprises: a status mutex initiator 8; an AHB receiver 10; a data mutex initiator 12; and a data mutex terminator 14. The AHB receiver 10 comprises: a finite state machine (FSM) 16; and two multi-flip-flop synchronisers 18, 20. The AHB receiver 10 is known as a 'receiver', because it receives data from a first bus 11.

The master module 6 comprises: a status mutex terminator 22; an AHB transmitter 24; a data mutex terminator 26; and a data mutex initiator 28. The AHB transmitter 24 comprises: an FSM 30; and two multi-flip-flop synchronisers 32, 34. The AHB transmitter 24 is known as a transmitter, because it transmits data to a second bus 13.

The status mutex initiator 8 of the slave module 4 and the status mutex terminator 22 of the master module 6 together form a 'status mutex', i.e. a mutex that monitors the status of the connection between the slave module 4 and the master module 6 across the asynchronous interface 7 as will be described in further detail below.

Similarly, the data mutex initiator 12 of the slave module 4 and the data mutex terminator 26 of the master module 6 together form a transaction channel between the slave module 4 and the master module 6, while the data mutex terminator 14 of the slave module 4 and the data mutex initiator 28 of the master module 6 together form a return channel between the slave module 4 and the master module 6.

The procedure used to transfer data 43 from the first bus 11 to the second bus 13 is described below with reference to FIG. 2, which is a flowchart showing the handshaking and transfer procedure carried out by the asynchronous bridge 2 when the slave module 4 receives data via the first bus 11 that needs to be transferred to the second bus 13 across the asynchronous interface 7 (i.e. over the clock- and power-domain boundary).

The procedure is initialised at step 100, and the slave module 4 determines whether the status mutex is currently locked at step 102. If the status mutex is not currently locked, the slave module determines whether the control acknowledgement flag 38 is raised or not. If the control acknowledgement flag 38 is not raised, the status mutex initiator 8 raises a control request flag 36 at step 106, which is detected by the status mutex terminator 22. However, if at step 104 the control acknowledgement flag 38 is raised despite the control request flag 36 not yet being raised, this indicates a desynchronisation 101 has occurred and that the asynchronous bridge 2 waits at step 103 until the desynchronisation 101 has been detected by both the slave module 4 and the master module 6 before returning to step 102 and checking whether the status mutex is locked.

Assuming no desynchronisation is detected at step 104 and that the control request flag was raised at step 106, the master module 6 determines, at step 108, whether the locked flag 40 is raised. If the locked flag 40 is not currently raised, the status mutex terminator 22 then raises a control acknowledgement flag 38 in response to the control request flag 36 at step 110, which is detected by the status mutex initiator 8. If, however, at step 108 the locked flag 40 is raised before the control acknowledgement flag 38 has been, this indicates a desynchronisation 101. As outlined above, the asynchronous bridge 2 waits at step 103 until the desynchronisation 101 has been detected by both the slave module 4 and the master module 6 before returning to step 102 and checking whether the status mutex is locked.

At step 112, the status mutex initiator 8 raises a mutex locked flag 40 and the mutex formed by the status mutex initiator 8 and the status mutex terminator 22 is locked. This request-and-acknowledgement procedure essentially forms a first two-phase handshake.

The procedure carried out using the mutex assures that the slave module 4 and the master module 6 are synchronised to (i.e. 'in step' with) each other and monitors this for desynchronisation throughout data transactions, as outlined below.

Providing the mutex is locked, the AHB receiver 10 may transfer data received via the first bus 11 to the master module 6 across the asynchronous interface 7. In order to signal that data is to be transferred from the slave module 4 to the master module 6, the data mutex initiator 12 of the transaction channel (i.e. the data mutex initiator 12 of the slave module 4) toggles the value of a data request flag 42 at step 114. It will be appreciated that by toggling the value of the data request flag 42, this means changing the value to the logical negation of its current value, i.e. if it is currently a digital '1', it is changed to a digital '0' and vice versa. The AHB receiver 10 then transfers the data 43 across the asynchronous interface 7 through the multi-flip-flop synchroniser 18 and raises a valid flag 45.

The data mutex terminator 26 of the transaction channel (i.e. the data mutex terminator 26 of the master module 6) detects this change in the data request flag 42 and determines from the valid flag 45 that valid data 43 is present and ready to be transferred across to the second bus 13. The AHB transmitter 24 within the master module 6 receives the data 43 from the AHB receiver 10 (i.e. from the slave module 4) via the multi-flip-flop synchroniser 32. The data mutex terminator 26 then toggles the value of a data acknowledgement flag 44 so as to match the value of the data request flag 42, acknowledging the safe receipt of the data 43 at step 118.

It is determined at step 120 whether more data is to be transferred across the asynchronous interface 7. If further data is to be transferred from the first bus 11 to the second bus 13, the procedure returns to step 102 and the process is repeated as outlined above. Otherwise, the procedure ends at step 122.

Figure 2:
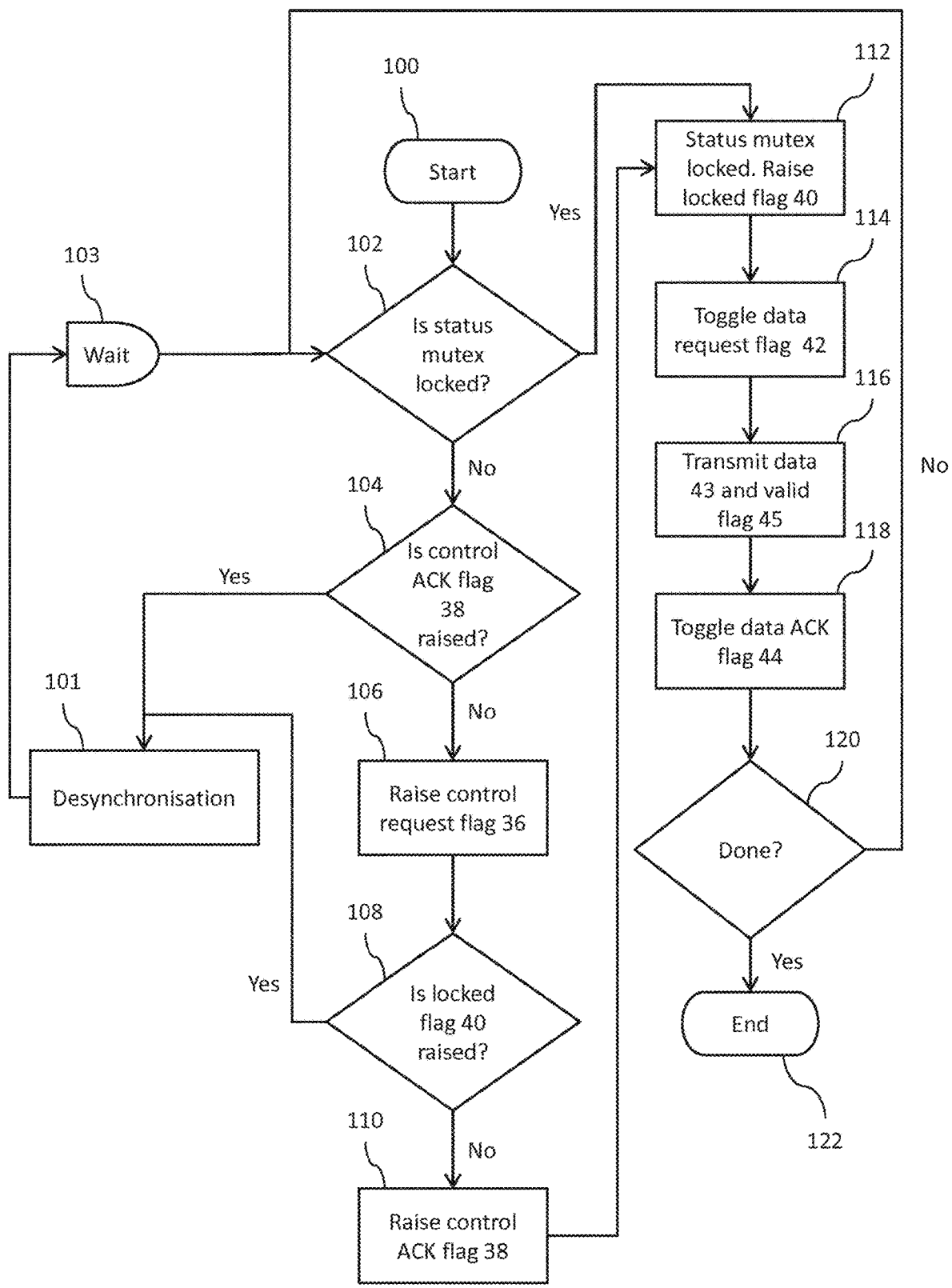
FIG. 2 is a flowchart showing the handshaking and transfer procedure carried out by the asynchronous bridge of FIG. 1.

While not shown in FIG. 2, the AHB transmitter 24 within the master module 6 may similarly transfer data to the AHB receiver 10 across the asynchronous interface 7 using the return channel, i.e. using the data mutex initiator 28 of the master module 6 and the data mutex terminator 14 of the slave module 4. In order to signal that data is to be transferred from the master module 6 to the slave module 4, the data mutex initiator 28 of the return channel toggles the value of a data request flag 46. The AHB transmitter 24 then transfers the data 47 across the asynchronous interface 7 through the multi-flip-flop synchroniser 34 and raises a valid flag 49.

The data mutex terminator 14 of the return channel (i.e. the data mutex terminator 14 of the slave module 4) detects this change in the data request flag 46 and determines from the valid flag 49 that valid data 47 is present and ready to be transferred across to the first bus 11. The AHB receiver 10 within the slave module 4 receives the data 47 from the AHB transmitter 24 (i.e. from the master module 6) via the multi-flip-flop synchroniser 20. The data mutex terminator 14 then toggles the value of a data acknowledgement flag 48 so as to match the value of the data request flag 46, acknowledging the safe receipt of the data 47.

Figure 3:
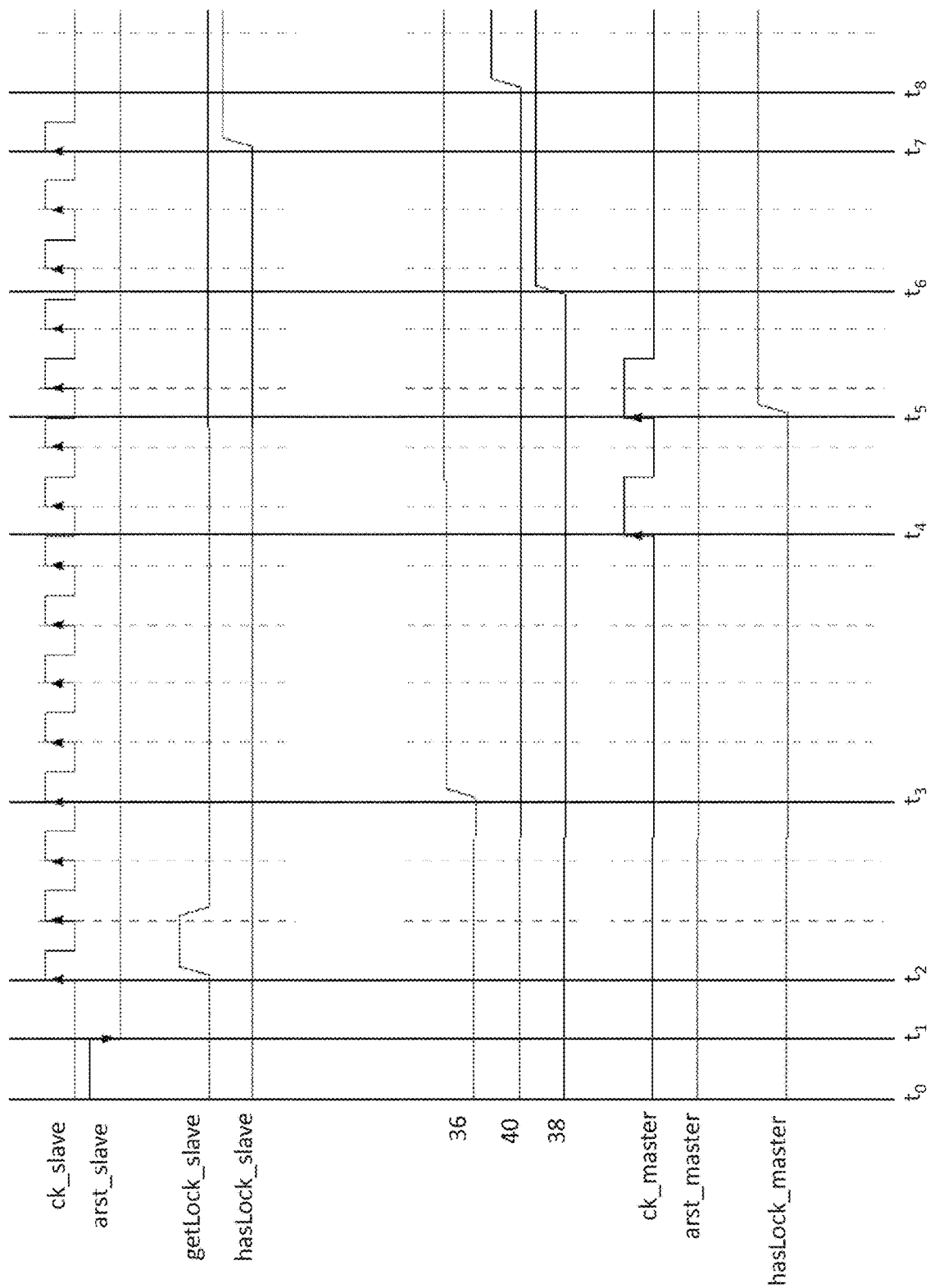
FIG. 3 is a timing diagram showing the status mutex locking operation used in the asynchronous bridge of FIG. 1.

FIG. 3 is a timing diagram showing the status mutex locking operation used in the asynchronous bridge of FIG. 1. Initially, at time to, the slave module 4 is held in reset by its asynchronous reset signal arst_slave being held at logic high. At time $t_1$, the asynchronous reset signal arst_slave of the slave module 4 is set to logic low, allowing the slave module 4 out of reset. Subsequently, at time $t_2$, the slave module 4 starts the process of locking the status mutex by setting an internal signal getLock_slave high, and also initiates a clock signal ck_slave which clocks components within the slave module 4, including the multi-flip-flop synchronisers 18, 20 that are used for transferring data from the first bus 11.

At time $t_3$, the status mutex initiator 8 raises a control request flag 36 as outlined previously above. In this case, no desynchronisation takes place and the status mutex terminator 22 determines that it should acknowledge the request. Before it does so, a clock signal ck_master used by components of the master is initialised at $t_4$. The master module 6 subsequently determines that no desynchronisation has taken place and so can set an internal signal hasLock_master to logic high at $t_5$, indicating that the master module 6 considers the status mutex to be locked (pending the slave module 4 doing the same).

The status mutex terminator 22 subsequently raises the control acknowledgement flag 38 at $t_6$, which is detected by the status mutex initiator 8. The status mutex initiator 8 sets an internal signal hasLock_slave to logic high at $t_7$, indicating that the slave module 4 considers the status mutex to be locked. The status mutex initiator 8 then sets the locked flag 40 to logic high at $t_8$, indicating that the status mutex is locked.

Figure 4:
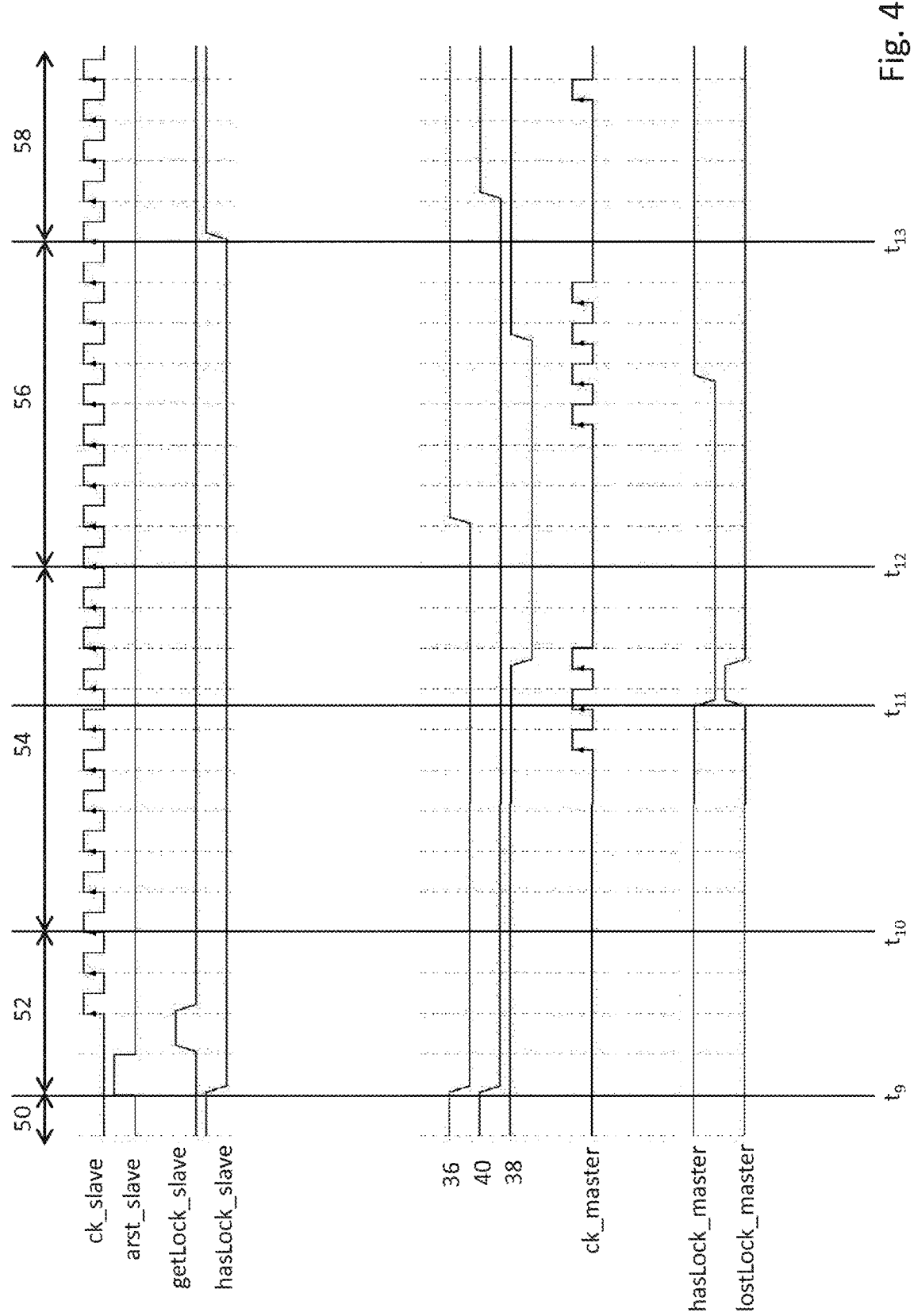
FIG. 4 is a timing diagram showing the desynchronisation operation of the asynchronous bridge of FIG. 1 when the slave module resets before the master module is provided with its clock.

FIG. 4 is a timing diagram showing the desynchronisation operation of the asynchronous bridge of FIG. 1 when the slave module resets before the master module is provided with its clock. When attempting to lock the status mutex, the status mutex initiator 8 will keep the locked flag 40 low and pull the control request flag 36 high, but only if the control acknowledgement flag 38 is low, as outlined previously.

After an initial idle period 50, at time $t_9$, the slave module 4 is reset by pulsing its asynchronous reset signal arst_slave to logic high. The reset of the slave module 50 also pulls the control request flag 36 and the locked flag 40 to logic low. Once the asynchronous reset signal arst_slave of the slave module 4 returns to logic low, the slave module 4 is allowed out of reset and the slave module enters a 'bootstrapping' period 52, during which time the slave module 4 attempts to start locking the status mutex as outlined above with reference to FIG. 3, setting the internal signal getLock_slave high and initiating the clock signal ck_slave as outlined above.

However, at time $t_{10}$, the control acknowledgement flag 38 is already high when attempting to lock the status mutex, this indicates that the master module 6 has not yet detected the desynchronisation. The slave module 4 then enters a wait period 54 until the master module 6 detects that the desynchronisation has occurred (i.e. the master module 6 determines that the slave module 4 has been reset). The master module 6 detects the loss of the lock of the status mutex at time $t_{11}$, and sets its internal signal hasLock_master to logic low and pulses a further internal signal lostLock_master, that indicates the status mutex having lost its lock, to logic high.

Once this has been detected, the status mutex enters a locking period 56 at time $t_{12}$ in which the status mutex initiator 8 and terminator 22 undergo the locking procedure outlined above such that the status mutex is locked. The status mutex then enters a locked state 58 at time $t_{13}$ thereafter until the lock is lost at a later time (not shown).

Figure 5:
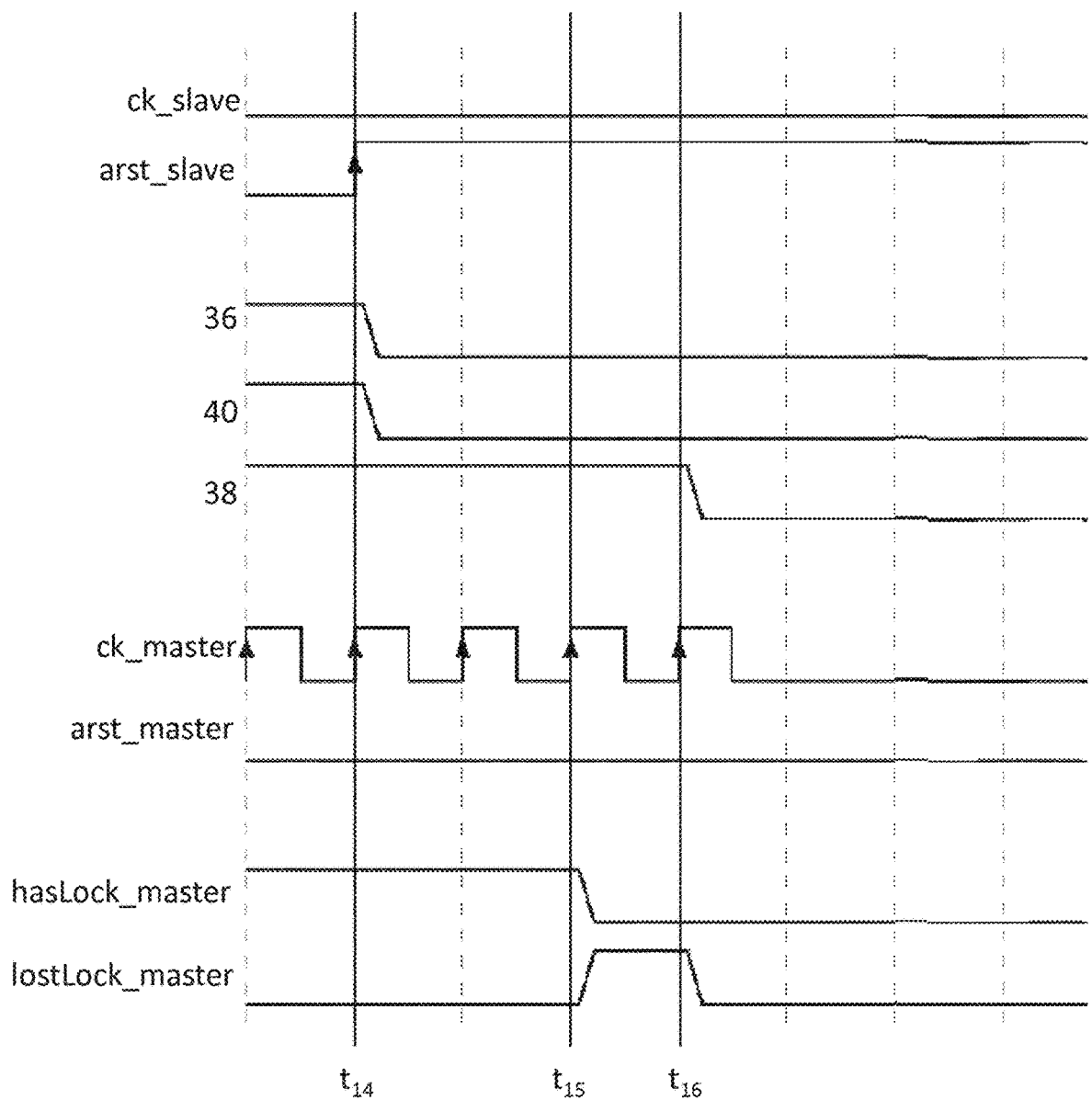
FIG. 5 is a timing diagram showing the operation of the asynchronous bridge of FIG. 1 when the slave module breaks the status mutex lock.

FIG. 5 is a timing diagram showing the operation of the asynchronous bridge of FIG. 1 when the slave module 4 breaks the status mutex lock. At time $t_{14}$, the slave module 4 is reset by pulling its asynchronous reset signal arst_slave to logic high. When this occurs, the status mutex control signals managed by the status mutex initiator 8, i.e. the control request flag 36 and the locked flag 40 are pulled to logic low. The master module 6 detects the loss of the lock at $t_{15}$ and sets its internal signal hasLock_master to logic low and pulses lostLock_master to logic high. The status mutex terminator 22 then sets the control acknowledgement flag 38 to logic low at $t_{16}$.

Figure 6:
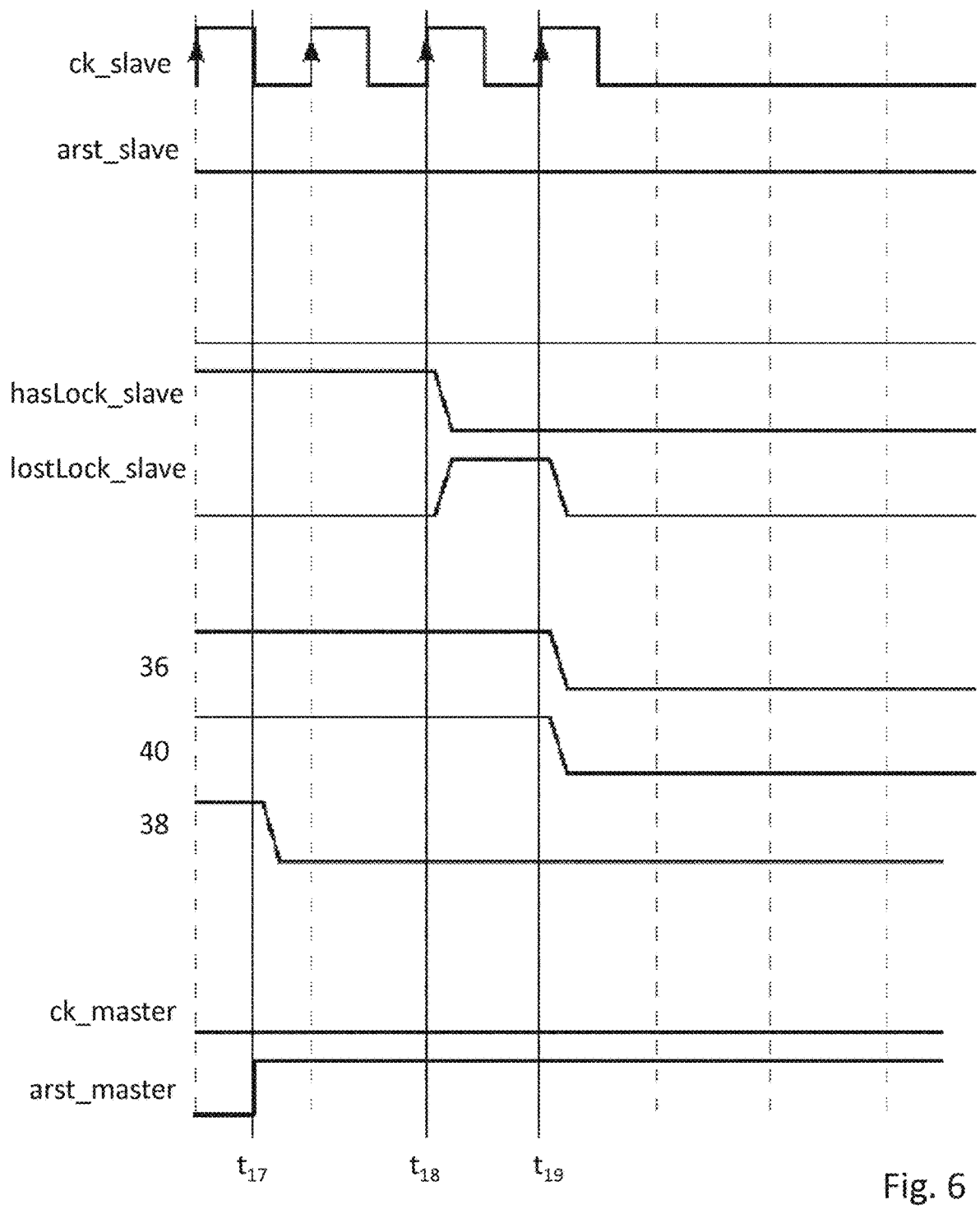
FIG. 6 is a timing diagram showing the operation of the asynchronous bridge of FIG. 1 when the master module breaks the status mutex lock.

Similarly, FIG. 6 is a timing diagram showing the operation of the asynchronous bridge of FIG. 1 when the master module 6 breaks the status mutex lock.

At time $t_{17}$, the master module 6 is reset by pulling its asynchronous reset signal arst_master to logic high. When this occurs, the status mutex control signal managed by the status mutex terminator 22, i.e. the control acknowledgement flag 38 is pulled to logic low. The slave module 4 detects the loss of the lock at $t_{18}$ and sets an internal signal hasLock_slave to logic low and pulses a signal lostLock_slave indicating that the mutex lock has been lost to logic high. The status mutex initiator 8 then sets the control request flag 36 and the locked flag 40 to logic low at $t_{19}$.

FIG. 7 is a timing diagram showing the operation of the data mutex used in the asynchronous bridge of FIG. 1. At time $t_{20}$, the master module 6 is released from reset by setting its asynchronous reset signal arst_master to logic low. At time $t_{21}$, the slave module 4 is also released from reset by setting its asynchronous reset signal arst_slave to logic low, and the data mutex initiator 12 pulses a signal newTrans(in) to logic high, which indicates to the FSM 16 of the slave module 4 that a data transaction event is to occur. The data mutex initiator also begins transferring the data 43 at this time $t_{21}$.

Once the data 43 has been set up and is stable, the data mutex initiator 12 toggles the value of the data request flag 42 at $t_{22}$ and the AHB receiver 10 then transfers the data 43 across the asynchronous interface 7 through the multi-flip-flop synchroniser 18. For correct operation, the data 43 must remain stable until it is received by the master module 6.

After the data mutex terminator 26 has synchronised the toggling of the data request flag 42, the data mutex terminator 26 pulses a signal newTrans(out) to logic high at $t_{23}$, which indicates to the FSM 30 of the master module 6 that a transaction is occurring. After sampling the data 43, the FSM 30 of the master module 6 sets a further signal acceptTrans(in) to logic high at $t_{24}$, which indicates that the transaction has been successfully accepted by the master module 6. The master module 6 then toggles the data acknowledgement flag 44 to match the value of the data request flag 42 at $t_{25}$.

After detecting the toggling of the data request flag 42, at $t_{26}$ the slave module 4 pulses a further signal acceptTrans (out) to logic high, which indicates that the acknowledgement has been successfully accepted by the slave module 4, and sets the waiting signal to logic low at $t_{27}$, concluding the transaction.

The process described with reference to FIG. 7 may then be repeated continually until such a time that the status mutex loses its lock.

Thus it will be appreciated by those skilled in the art that embodiments of the present invention provide an improved electronic device including an oscillator circuit and an improved method for operating the same in which a four-phase handshake is used for an initial transaction in which a mutex is used to monitor the synchronisation status of the bridge, but that two-phase transactions are used for further transactions so long as the mutex remains locked. An asynchronous bridge in accordance with embodiments of the present invention may therefore be more robust against desynchronisation events than a conventional two-phase handshake while carrying out transactions faster than a conventional four-phase handshake. It will be appreciated by those skilled in the art that the embodiments described above are merely exemplary and are not limiting on the scope of the invention.

The invention claimed is:

1. A method of transferring data from a first bus to a second bus across an asynchronous interface between said first and second buses, using an asynchronous bridge comprising:
   a bus slave module, connected to the first bus, comprising a forward-channel initiator in a first power and/or clock domain; and
   a bus master module, connected to the second bus, comprising a forward-channel terminator in a second power and/or clock domain;
   wherein the forward-channel initiator and the forward-channel terminator are in communication to form a forward lockable mutex for arbitrating access to signals used to transfer data from the first power and/or clock domain to the second power and/or clock domain;
   the method comprising:
   if said lockable mutex is locked, using a forward data channel to transfer data between said first and second power and/or clock domains;
   if said lockable mutex is unlocked, said forward channel initiator toggling a status request signal and the forward channel terminator toggling a status acknowledge signal in response; the lockable mutex thereby becoming locked.

2. The method as claimed in claim 1, wherein the bus slave module comprises a reverse-channel terminator and the bus master module comprises a reverse-channel initiator; wherein the reverse-channel initiator and the reverse-channel terminator are in communication to form a reverse lockable mutex for arbitrating access to signals used to transfer data from the second power and/or clock domain to the first power and/or clock domain.

3. The method as claimed in claim 2, further comprising:
   if said reverse lockable mutex is locked, using a reverse data channel to transfer data between said second and first power and/or clock domains;
   if said reverse lockable mutex is unlocked, said reverse channel initiator toggling a status request signal and the reverse channel terminator toggling a status acknowledge signal in response; the reverse lockable mutex thereby becoming locked.

4. The method as claimed in claim 1, further comprising:
   if either side of the asynchronous bridge is reset or loses power thereby giving rise to a desynchronisation of the lockable mutex and/or the reverse lockable mutex, detecting said desynchronisation by the initiator or terminator on the other side.

5. The method as claimed in claim 1, further comprising:
   if both sides of the asynchronous bridge are reset or lose power thereby giving rise to a desynchronisation, automatically performing a resynchronisation.

6. The method as claimed in claim 1, further comprising:
   if the lockable mutex and/or the reverse lockable mutex is/are locked, and a status request signal or a status acknowledge signal changes value, performing a resynchronisation.

7. The method as claimed in claim 5, wherein said resynchronisation comprises one of said channel initiators toggling a status request signal and the corresponding channel terminator toggling a status acknowledge signal in response; the lockable mutex and/or the reverse lockable mutex thereby becoming locked.

8. The method as claimed in claim 1, further comprising:
   if the lockable mutex and/or the reverse lockable mutex is/are locked, preventing a change in the status request and status acknowledge signals.

9. The method as claimed in claim 2 wherein, if the lockable mutex and/or the reverse lockable mutex is/are locked, using two additional signals to implement a handshake whereby each toggle of a data-request signal indicates a request for handshake and each toggle of data-acknowledge indicates the completion of the handshake.

10. The method as claimed in claim 1, further comprising:
    if, during a data transfer, the status request and/or status acknowledge signals change value, one of the slave module and the master module which has detected said change in value, changing all signals to corresponding reset values and the other of the slave module and the master module, when its reset completes before the other side can return to the reset value, waiting until all handshake signals across the boundary are their reset values again.

11. An asynchronous bridge arranged to transfer data from a first bus to a second bus across an asynchronous interface between said first and second buses, said asynchronous bridge comprising:
    a bus slave module, connected to the first bus, comprising a forward-channel initiator in a first power and/or clock domain; and
    a bus master module, connected to the second bus, comprising a forward-channel terminator in a second power and/or clock domain;
    wherein the forward-channel initiator and the forward-channel terminator are in communication to form a forward lockable mutex for arbitrating access to signals used to transfer data from the first power and/or clock domain to the second power and/or clock domain;

wherein the asynchronous bridge is arranged such that:
if said lockable mutex is locked, the asynchronous bridge uses a forward data channel to transfer data between said first and second power and/or clock domains;
if said lockable mutex is unlocked, said forward channel initiator toggles a status request signal and the forward channel terminator toggles a status acknowledge signal in response; the lockable mutex thereby becoming locked.

* * * * *